United States Patent
Venkatesan et al.

(12)

(10) Patent No.: US 6,282,550 B1
(45) Date of Patent: Aug. 28, 2001

(54) APPARATUS AND METHOD OF UTILIZING A DATABASE TO CORRELATE CUSTOMER REQUESTS AND SUPPLIERS CAPABILITIES FOR CUSTOM SYNTHESIS OF POLYMERS

(75) Inventors: Jay Raman Venkatesan; Todd Riley Johnson, both of Philadelphia; Joshua David Lynn, Elkins Park; Eric Christopher Parkinson, Philadelphia, all of PA (US)

(73) Assignee: Tangerine Technologies, Inc., Phila, PA (US)

( * ) Notice: Subject to any disclaimer, the term of this patent is extended or adjusted under 35 U.S.C. 154(b) by 0 days.

(21) Appl. No.: 09/480,192

(22) Filed: Jan. 10, 2000

(51) Int. Cl.[7] .................................................. G06F 17/30
(52) U.S. Cl. .................................. 707/104; 707/3; 705/26
(58) Field of Search ............................ 707/104, 3; 705/26

(56) References Cited

U.S. PATENT DOCUMENTS 5,953,727 * 9/1999 Maslyn et al. ........................ 707/104
6,189,013 * 2/2001 Maslyn et al. ........................ 707/104

FOREIGN PATENT DOCUMENTS

WO 00/49550
A1 * 8/2000 (WO) ............................ G06F/178/60

OTHER PUBLICATIONS

Oligos.com Online Catalog, downloaded from http://www,merc.com/4DCGI/OLG_Goto_Catalog/381824821/130/4DWPG_6355894, downloaded Mar. 13, 2001, p 1–2.*

Alper, Joe, "Making the Picks and Shovels of the Genomics Gold Rush", Aug. 4, 2000, downloaded from http://www.doubletwist.com/news/columns/...e_ihtml?section=weekly01&name=weekly0119 on Mar. 13, 2001, p1–8.*

Yahoo!UK–Ireland home>Business and Economy!Business to business?Scientific?Biology, downloaded from http://uk.dir.yahoo.com/Business_and_Eco . . .Business/Scientific/Biology/Instruments/, p 1–3.* http://www.biotaq.com/CombinatorialChemistry/CombinChem.htm, downloaded Mar. 13, 2001, p. 1–2.* http://www.chemdex.org/chemdex/commercial–us.html, downloaded Mar. 13, 2001, p 1–11.* http://www.tangerinetech.com/About/News/022201_tt_introduces_OligoBuyer.htm , downloaded Mar. 18, 2001, entire document, p1–2.*

* cited by examiner

Primary Examiner—Paul R. Lintz
(74) Attorney, Agent, or Firm—Reed Smith LLP; Maryellen Feehery

(57) ABSTRACT

A method for providing information to a customer who is requesting a synthesized oligonucleotide, peptide, peptide nucleic acid, polysaccharide or antibody (collectively "strands"). The capabilities of one or more suppliers are stored and automatically searched for capabilities to synthesize the requested strand. A list of the suppliers with the required capabilities is generated along with the price of the strand. The invention also encompasses an apparatus for providing information to remote users regarding which suppliers can supply a desired strand. The apparatus has a database and a server which allows the remote user to access the capabilities of one or more suppliers for synthesizing a strand.

52 Claims, 19 Drawing Sheets

Custom Synthesis

Explanatory/Instructional copy.Explanatory/Instructional copy.Explanatory/Instructional copy. Click here for help.

74 ─── Select Backbone      Select Scale of Synthesis

```
DNA              100nmole
RNA              200nmole
2-o Me RNA       1  umole
Others           10umole
```

Specify Sequence:    # of bases: 18

5'  ACG GTC ACG GAC CAG ACT  3'
     3    6    9    12   15   18

72 ─── BASES: ☐ ☐ ☐ ☐ ☐

73 ─── MODIFIED BASES: ☐ ☐ ☐ ☐ ☐ ☐ ☐ ☐
                       ☐ ☐ ☐ ☐ ☐ ☐ ☐ ☐

Stock Primers:

71 ─── Some vendors maintain the following primers for sequencing if desired Additional copy. Additional copy. Additional copy. Additional copy. Additional copy.

```
M12-20 forward (18)  TGT AAA ACG ACG GCC AGT
M13-48 reverse (24)  AGC GCA TAA CAA TTT CAC ACA GGA
   17 PROMOTER (20)  TAA TAC GAC TCA CTA TAG GG
           13 (20)   ATT AAC CCT CAC TAA AGG GA
```

76 — Select 5' Tags, Modifications, and Conjugates

77 — Select 3' Tags, Modifications, and Conjugates

78 — Select Internal tags

```
Phospharylation
Aminio Modifier C6
Aminio Modifier C12
Biotin
Biotin TEG
G3 Spacer
G18 Spacer
Digoxigenin
etc...
```

```
Phospharylation
Aminio Modifier C7
Biotin
DeoxyInosine
DeoxyIUndine
Digoxigenin
Thor Modifier
Fluorescein
etc...
```

```
Phospharylation
Aminio Modifier C7
Biotin
DeoxyInosine
DeoxyIUndine
Digoxigenin
Thor Modifier
Fluorescein
etc...
```

79 — Select Purification Method;

```
Desalt
Cartridge
HRLC
PAGE
HRLC+PAGE
```

To select multiple internal tags from the list above press the Control key (PC) or Command key (Macintosh) while clicking on the tags.

Name your Oligo: [                    ]

Naming your oligo will allow you to track your custom order as it is processed through the BioSupplies system.

Comments/Special Instructions: [                    ]

Please do not include any instructions about procedures which may be specified by using the interface elements above.

Pricing

The following is a list of vendors able to synthesize the oligo you specified. Please click on a price to initiate the ordering process. Click on a vendor to view its profile.

| Vendors | Scale of Syntheses | Price |
|---|---|---|
| Vendor A | 200nmole | $xxx.xx |
| Vendor B | 200nmole | $xxx.xx |
| Vendor C | 200nmole | $xxx.xx |
| Vendor D | 200nmole | $xxx.xx |
| Vendor E | 200nmole | $xxx.xx |
| Vendor F | 200nmole | $xxx.xx |
| Vendor G | 200nmole | Please Inquire |
| Vendor H | 200nmole | $xxx.xx |
| Vendor I | 200nmole | $xxx.xx |
| Vendor J | 200nmole | Please Inquire |
| Vendor K | 200nmole | $xxx.xx |
| Southwest Scientific Resources | 200nmole | $xxx.xx |
| Synthetic Genetics | 200nmole | $xxx.xx |

OR(cases where scale not specified by user)

| Vendors | Scale of Syntheses | Price |
|---|---|---|
| Vendor A | 100nmole | $xxx.xx |
| | 200nmole | $xxx.xx |
| | 1umole | $xxx.xx |
| | 10umole | $xxx.xx |
| Vendor E | 100nmole | $xxx.xx |
| | 200nmole | $xxx.xx |
| | 1umole | $xxx.xx |
| | 10umole | $xxx.xx |
| Southwest Scientific Resources | 100nmole | $xxx.xx |
| | 200nmole | $xxx.xx |
| | 1umole | $xxx.xx |
| | 10umole | $xxx.xx |

FIG. 6C

Custom Synthesis
<Vendor Name> Terms and Conditions

Explanatory/Instructional copy. Explanatory/Instructional copy. Explanatory/Instructional copy. Please print this page for your records 83 ──→ Specification for <oligo name>

| | |
|---:|:---|
| Backbone: | DNA |
| Quantity/Scale of Synthesis: | 200nmole |
| Sequence: | ACG GTC ACG GAC CAG ACT |
| 5' Modification: | Biotin |
| 3' Modification: | Deoxylnosine |
| Internal Tag(s): | |
| Purification Method: | DeSalt |
| | |
| Comments/Special Instruction: | Please include literature about your services |
| Sub-total: | $xxx.xx |
| Vendor taxes: | $x.xx |
| Total: | $xxx.xx |

Note: This price does not include shipping and handling. You may specify shipping options for your oligo once you add it to your shopping cart.

Some venders offer volume discounts for orders of multiple oligos. These discounts will be taken off of the price at checkout.

[ Add to Favorites ]

84 ──→ Waiver

Waiver Copy. Waiver Copy. Waiver Copy. Waiver Copy. Waiver Copy. Waiver Copy. Waiver Copy. Waiver Copy. Waiver Copy. Waiver Copy. Waiver Copy. Waiver Copy. Waiver Copy. Waiver Copy.

85 ──→ Vendor terms

Supplier Terms. Supplier Terms. Supplier Terms. Supplier Terms. Supplier Terms. Supplier Terms. Supplier Terms. Supplier Terms. Supplier Terms. Supplier Terms. Supplier Terms. Supplier Terms.

FIG. 6D

Custom Synthesis
<Vendor Name> Pricing Inquiry

Explanatory/Instructional copy.
copy. Please print this page for your records

Specification for <oligo name>

| | |
|---:|---|
| Backbone: | DNA |
| Quantity/Scale of Synthesis: | 200nmole |
| Sequence: | ACG GTC ACG GAC CAG ACT |
| 5' Modification: | Biotin |
| 3' Modification: | Deoxylnosine |
| Internal Tag(s): | |
| Purification Method: | DeSalt |

Comments/Special Instruction:   Please include literature about your services

<Vendor Name> requires this oligo to be priced via direct inquiry. BioSupplies will contact the vendor and determine their price for your oligo. Once we receive a quote, we will notify you via e-mail and provide instructions as to how to place your order in the BioSupplies system. This can only be done if you are a user, however. If you have not logged in, please do so now.

We will send pricing information when it becomes available to:
   <user's e-mail address>

<Vendor Name> requires this oligo to be priced via direct inquiry. BioSupplies will contact the vendor and determine their price for your oligo. Once we receive a quote, we will notify you via e-mail and provide instructions as to how to place your order in the BioSupplies system. Please log-in so that we may send you this e-mail, If you do not have an account with BioSupplies, please enter your e-mail address below.

86 ──→ E-mail address: [          ]

FIG. 6E

APPARATUS AND METHOD OF UTILIZING A DATABASE TO CORRELATE CUSTOMER REQUESTS AND SUPPLIERS CAPABILITIES FOR CUSTOM SYNTHESIS OF POLYMERS

FIELD OF THE INVENTION

The medical and biological arenas have undergone significant development in research and many researchers require custom synthesis of polymers, including but not limited to oligonucleotides, peptides, peptide nucleic acids, polysaccharides and antibodies. The invention described herein is for use in the health, medical, medical research, biological and biotechnical fields.

BACKGROUND OF THE INVENTION

Researchers in the medical and biological fields often require custom synthesis of polymers, including but not limited to oligonucleotides, peptides, peptide nucleic acids, polysaccharides and antibodies. There are millions of permutations of oligonucleotides, peptides, peptide nucleic acids, polysaccharides and antibodies that can be synthesized, and researchers currently must contact numerous suppliers in an effort to find a supplier that is able to and will produce specific oligonucleotides, peptides, peptide nucleic acids, polysaccharides and antibodies. This is a time consuming, inefficient and not always productive process, which rarely reveals the lowest available price for the requested product.

SUMMARY OF THE INVENTION

The present invention eliminates the need to make multiple phonecalls or contacts to multiple suppliers. By requesting the specific oligonucleotide, peptide, peptide nucleic acid, polysaccharide or antibody through the inventive system maintained by the provider, the customer makes one request and multiple suppliers' synthesis capabilities are searched. A list of capable suppliers and their prices are generated for the customer. The customer chooses a supplier and the synthesized oligonucleotide, peptide, peptide nucleic acid, polysaccharide or antibody is prepared and shipped to the customer. The provider bills the customer and pays the supplier.

As will be demonstrated herein, the invention is directed to an apparatus and method for storing the capabilities and pricing (collectively "Capabilities") of suppliers ("Supplier" or "Suppliers") of synthesized strands in any form, including but not limited to linear, cyclic or branched formations; providing access to the stored Capabilities; receiving a request ("Request") from a customer ("Customer") including a desired synthesized strand; automatically searching the stored Capabilities for one or more Suppliers that has the ability to fulfill the Request; and automatically generating a list of Suppliers who can fulfill the Request, and the prices at which each Supplier can fulfill the Request. Although the system utilized herein may take any appropriate form, preferably, the system is implemented using a global computerized network.

In a preferred embodiment of the invention ("First Embodiment"), a provider ("Provider") enters into one or more agreements with one or more Suppliers of synthesized oligonucleotides ("ON"), peptides ("PT") or peptide nucleic acids ("PNA") (the group of ON, PT and PNA are defined as "Strand" or "Strands"). (Other embodiments may include polysaccharides or antibodies in the definition of Strands.) The synthesized ON are defined as any one of dioxyribonucleic acid ("DNA"), ribonucleic acid ("RNA") or any modified nucleotides. Nucleotides comprise a nitrogenous base moiety, sugar moiety, and phosphate moiety or modifications of any of the three moieties. Synthesized PTs include Strands comprised of amino acids or modified amino acids. Synthesized PNAs include analogs of DNA with peptide-like backbones, for example made from N-(2-aminoethyl)-glycine with amino bonds and A, C,G and/or T monomers attached by methylene carbonyl bonds. The Suppliers provide information including the Supplier's capabilities ("Supplier's Capabilities" or "Capabilities" or "Supplier Capability Information") for synthesizing Strands to the Provider. The Supplier's Capabilities may include one or more of the following: backbones, nucleotides, modified nucleotides, amino acids, modified amino acids, scales of synthesis, 5' tags, 3' tags, internal tags, amino terminals, carboxyl terminals, relevant modifications, relevant conjugates, and the possible locations of said conjugates, dyes and the possible placement of said dyes, purification methods, branch points, synthesis limitations, and pricing algorithms for the Supplier's Strands. It should be understood that all of the Supplier Capabilities do not apply to all types of Strands, for example peptides do not utilize 5' tags or 3' tags. Additionally, any nucleotide modifications are only limited by the actual synthesizing abilities of each Supplier. Synthesis Limitations may include the maximum or minimum number of nucleotides in a Strand. The purification requirements may be limited by the other capabilities enumerated in the Customer's Request. A matrix may be created in the Database comprising all of the unique combinations of Supplier, backbone and scale of synthesis. The Pricing Algorithm preferably comprises a logical entity which relates each Supplier Capability to a cost and may limit a specific Supplier Capability to a given number of instances per Strand (e.g. each Strand may only have zero or one of each of the 3' or 5' tags due to the nature of these tags). Further, the Pricing Algorithm may include threshold discounts, which prices the Strand by the number of nucleotides and if a specified number is exceeded, all the nucleotides are discounted, or graduated discounts, which prices the Strand by the number of nucleotides and if a specified number is exceeded, all additional nucleotides are discounted.

Further in this First Embodiment, Customers who are in the market for synthesized Strands will access a database ("Database") through a network ("Network"), most preferably a global computer network. The Database preferably includes all of the Capabilities of each Supplier. The Customer places a Request for one or more synthesized Strands. The Customer may enter the Request as a customer generated sequence or may use the System's stock sequences stored in the Database for building Strands quickly. The Request may include one or more of the following: the specification of the sequence of one or more of: nucleotides, modified nucleotides, amino acids and modified amino acids; backbones (which may include, but are not limited to DNA, RNA or 2'-o-Me-RNA); nucleotides; modified nucleotides; amino acids; modified amino acids; scale of synthesis; 5' tags; 3' tags; internal tags; amino terminals; carboxyl terminals; relevant modifications; relevant conjugates; and the placement of said conjugates; dyes and placement thereof; purification requirements; a purification method, branch points and synthesis limitations ("Requested Strand" or "Desired Product Information"). It should be understood that all of the Desired Product Information do not apply to all types of Strands, for example peptides do not utilize 5' tags or 3' tags. The Customer's Request must include backbones, however, additional information is helpful for accurate pricing but is not required for the process to continue. The Database is automatically searched, preferably with iterative logic, to correlate the Request with each Supplier who has the requisite Capabilities to synthesize the Requested Strand. A list of one or more Suppliers with said capability ("List") is generated from the Database, and the Customer has the ability to access the List. The List may include the price generated by the Pricing Algorithm for each Matching Supplier and may correlate the price to the scale of synthesis.

The Customer then selects a Supplier ("Selected Supplier") from the list. If the price cannot be generated, then the customer is informed that a price quote ("Price Quote") will be sent to the Customer preferably via electronic mail. Supplier sends a Price Quote to Customer, preferably via the Provider. If the Customer accepts the price, the Network transmits the Request to the Selected Supplier. Then, the Selected Supplier accepts, rejects or modifies the Request ("Selected Supplier's Confirmation" or "Confirmation"). Such modifications may include but are not limited to changing the price for the Requested Strand from the amount generated by the Pricing Algorithm (stored in the Database) for the Supplier, and changing shipping information. The Confirmation is communicated to the Customer via the Network.

Continuing in this First Embodiment, the Network receives the Selected Supplier's Confirmation and conveys this to the Customer. If the Selected Supplier's Confirmation is a rejection, the Customer may return to the List and select another Supplier from the List. If the Selected Supplier's Confirmation is an acceptance, the Supplier will synthesize and ship the Requested Strand to the Customer. If the Selected Supplier's Confirmation is a modification, the Customer can review the Selected Supplier's Confirmation and accept or reject the Confirmation. If the Customer accepts the Confirmation via the Network, the Supplier will synthesize and ship the Requested Strand to the Customer.

Optionally, the Provider may automatically bill the Customer for the Requested Strand preferably via the Network. Further, the Customer may optionally choose to save or the Network may automatically save information regarding the Request, preferably including the Requested Strand linked with the associated Customer ("Saved Information"); and the Selected Supplier linked with the associated Customer ("Saved Supplier"). The Saved Information and/or Saved Supplier may be stored in a database, which may or may not be the Database.

Another embodiment works in a similar fashion to the above-described First Embodiment with the following modifications. The Customer has the Database recall the Saved Information. The Network transmits the Saved Information (as a Request) to the Supplier designated in the Saved Information or if no Supplier is designated, the Network generates a List from the Request using the Saved Information and the Customer selects a Supplier. Then the process proceeds as described in the First Embodiment after the selection of Supplier.

A further embodiment works in a similar fashion to the above-described First Embodiment with the following modifications. The Customer may include in its Request an automatic selection of the Supplier who has the capability to supply the Requested Strand for the lowest price according to the Supplier's pricing algorithm ("Lowest Price Supplier"). Without any further Customer selection of Suppliers, the Network transmits the Request to the Lowest Price Supplier. Then, the Lowest Price Supplier accepts, rejects or modifies the Request ("Lowest Price Supplier's Response"). Said modifications may include but are not limited to changing the price for the Requested Strand from the amount generated by the Pricing Algorithm for said Lowest Price Supplier, or changing shipping information. If the Lowest Price Supplier has increased its price from the price determined by the Supplier's Pricing Algorithm, the List may be searched and if there is another Supplier with a lower price on the List, the Network may transmit the Request to the second lowest price Supplier ("Second Supplier"). Optionally, the Response including the new price is communicated to the Customer via the Network without searching for the Second Supplier. The Customer may then have access to the List and select a new Supplier, if the Customer chooses.

Another embodiment works in a similar fashion to the above-described First Embodiment with the following modifications. The Customer may include in its Request one or more specified Suppliers ("Selected Suppliers"). If none of the Selected Suppliers has the requisite Capabilities to synthesize the Requested Strand, the Customer is informed and asked to modify the Request. Alternatively, if none of the Selected Suppliers has the requisite Capabilities to synthesize the Requested Strand, the process proceeds as the First Embodiment.

If one or more Selected Supplier has the requisite Capabilities, a List is automatically generated. If only one Selected Supplier has the requisite Capabilities, the Network may transmit the Request directly to the Selected Supplier. Then, the Selected Supplier accepts, rejects or modifies the Request. Preferably, the Supplier only modifies the Request if the Strand should be priced differently. If the Supplier needs to otherwise modify the Request, the Supplier preferably notifies the Provider and the Provider notifies the Customer, preferably via electronic mail. Such modifications may include but are not limited to changing the price for the Request from the amount generated by the pricing algorithm for said Selected Supplier, and changing shipping information. If the Selected Supplier rejects the Request or the Customer rejects the Selected Supplier's modification, the List is searched for another Supplier which is a Selected Supplier. If the List includes another Selected Supplier, the process proceeds as described above in this paragraph. In the instance that the List does not include another Selected Supplier, the process proceeds as the First Embodiment.

In another embodiment of this Invention, the Database comprises data regarding the Capabilities of a plurality of Suppliers. Customers, who are remote users, may access this Database via a server ("Server") and the Server receives the Customer's Requests. Further, the Server automatically searches the Database in order to generate the List. The Server connects the Customer and the Database, and the Supplier and the Database through a Network, preferably a global computer network.

BRIEF DESCRIPTION OF DRAWINGS

The invention will become more readily apparent from the following description of preferred embodiments thereof shown, by way of example only, in the accompanying drawings wherein:

FIG. 6A is a schematic representation of an exemplary Web page used in implementing a method in accordance with a preferred embodiment of the present invention.

FIG. 6B is a schematic representation of an exemplary Web page used in implementing a method in accordance with a preferred embodiment of the present invention.

FIG. 6C is a schematic representation of an exemplary Web page used in implementing a method in accordance with a preferred embodiment of the present invention.

FIG. 6D is a schematic representation of an exemplary Web page used in implementing a method in accordance with a preferred embodiment of the present invention.

FIG. 6E is a schematic representation of an exemplary Web page used in implementing a method in accordance with a preferred embodiment of the present invention.

DETAILED DESCRIPTION

Figure 1:
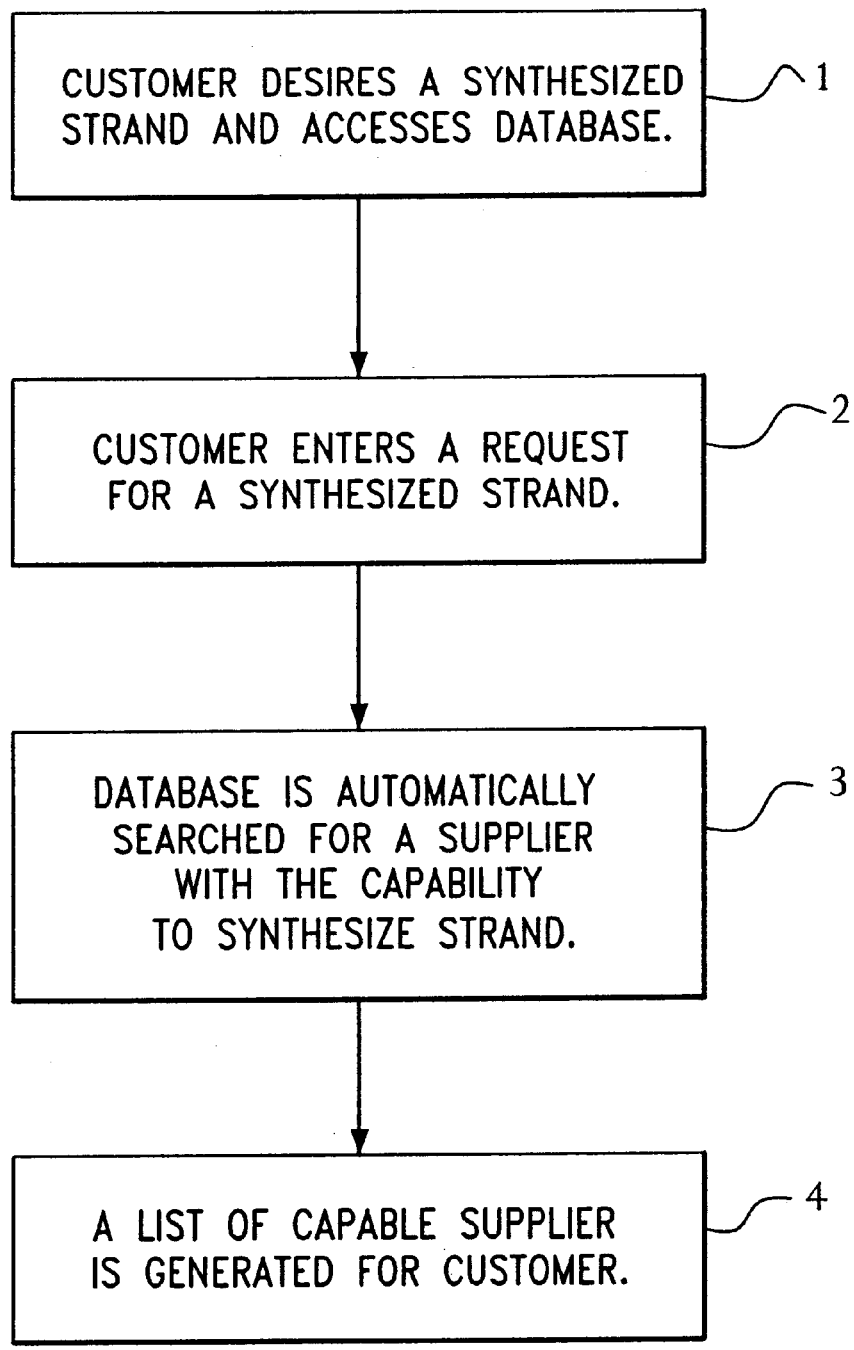
FIG. 1 is a flowchart of an embodiment of the invention, which displays the steps in the inventive process.
Figure 2A:
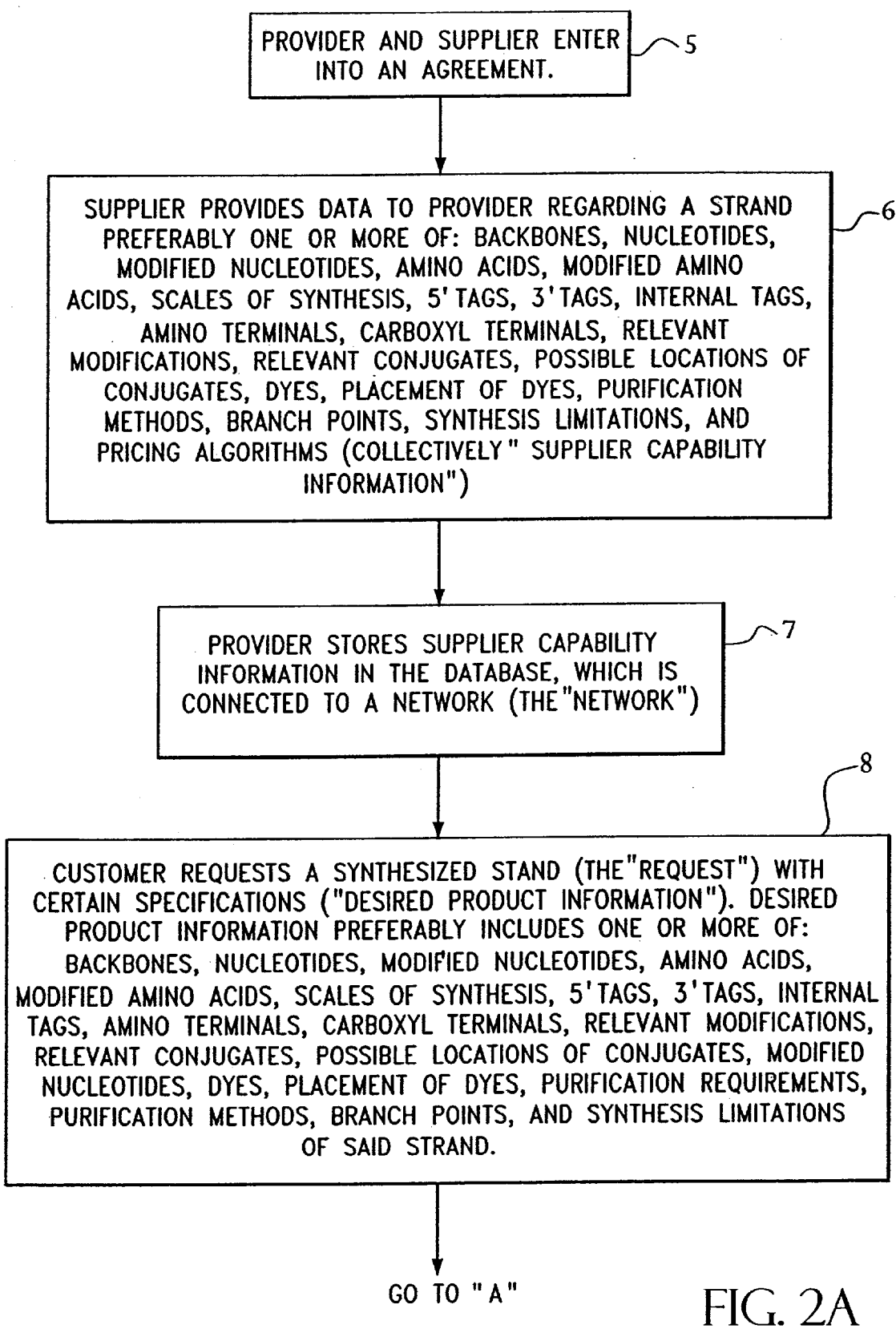
FIGS. 2A–2D represent a flowchart of yet another embodiment of the invention, which details the steps of the inventive process.
Figure 2B:
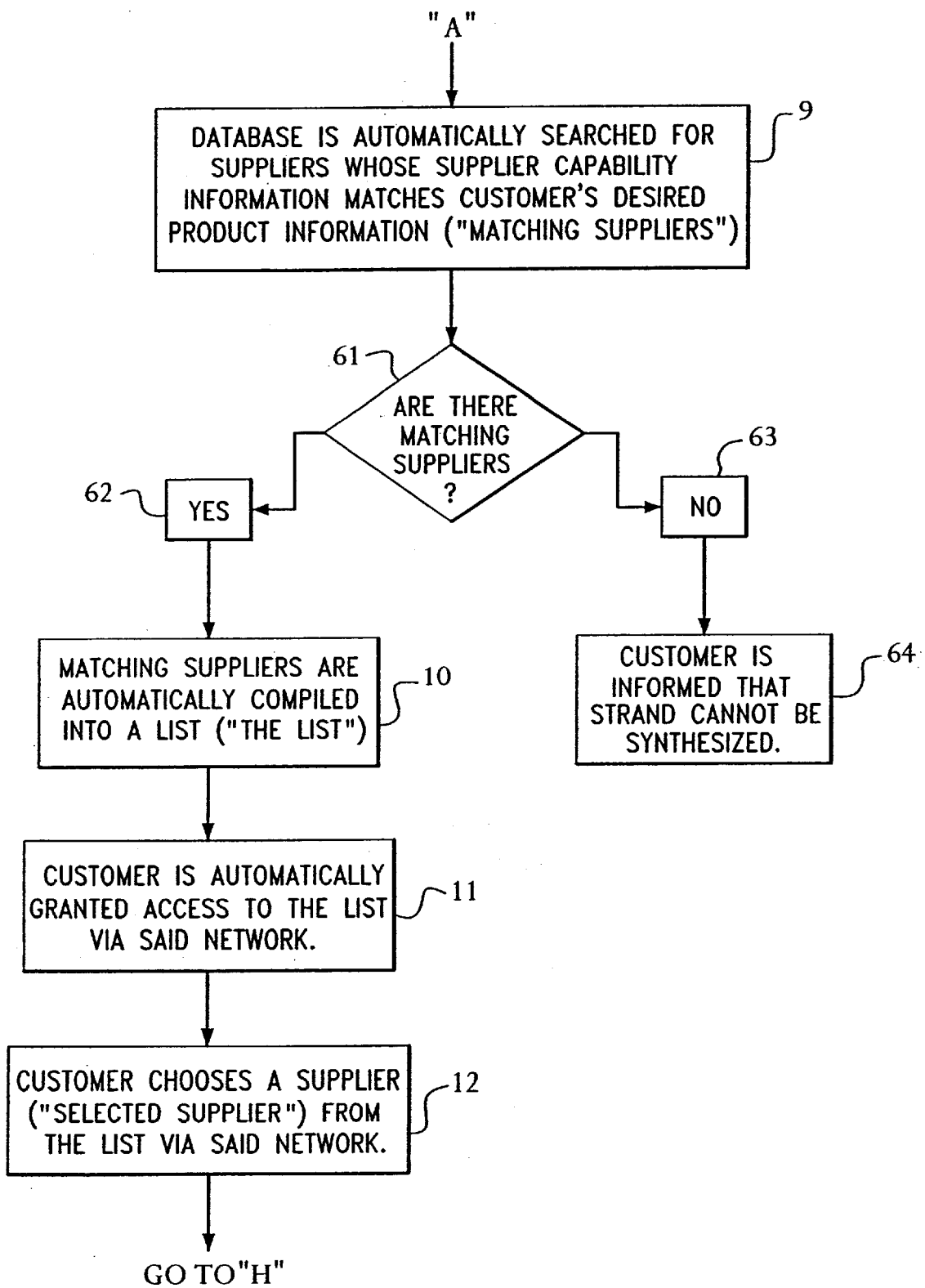
Figure 2C:
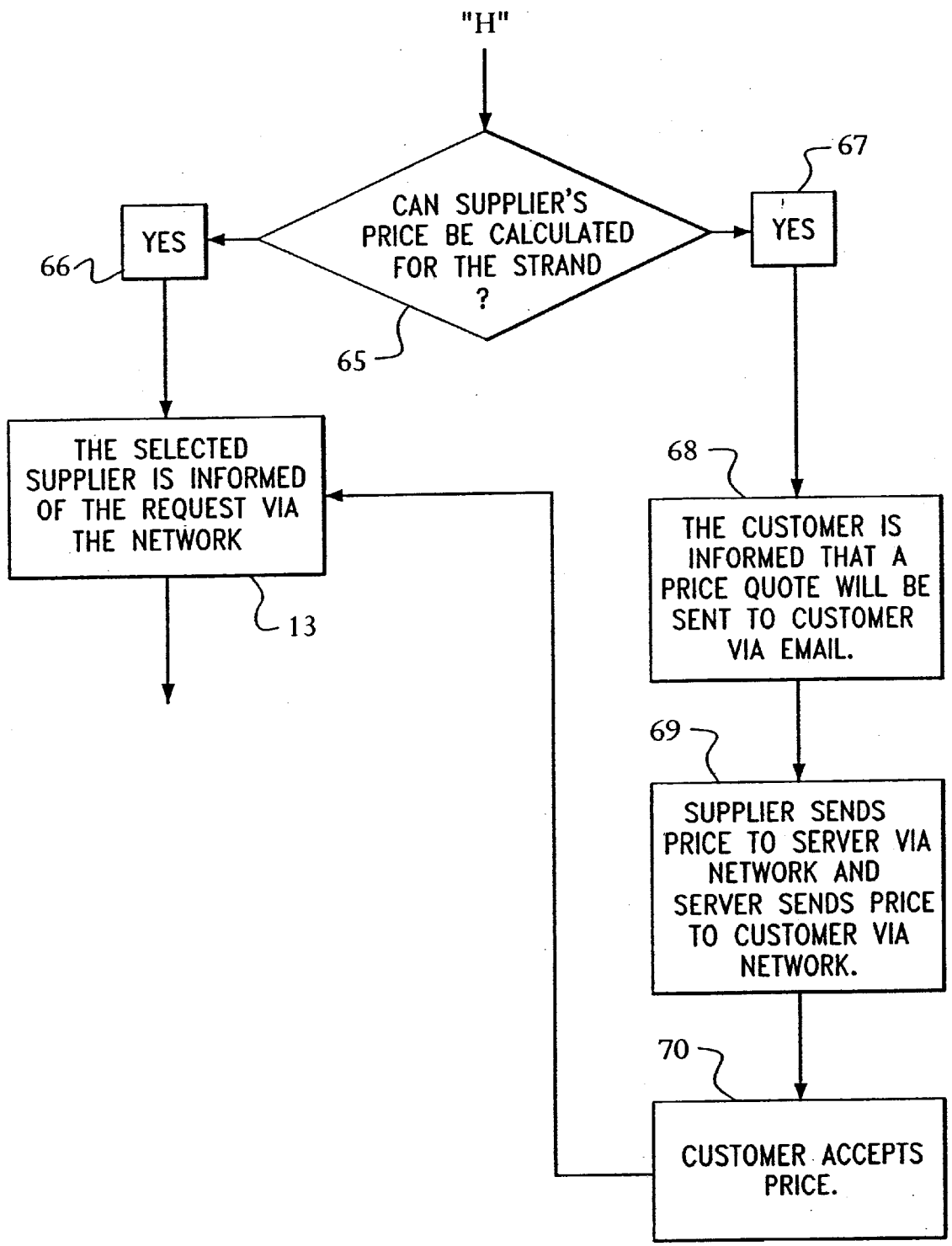
Figure 2D:
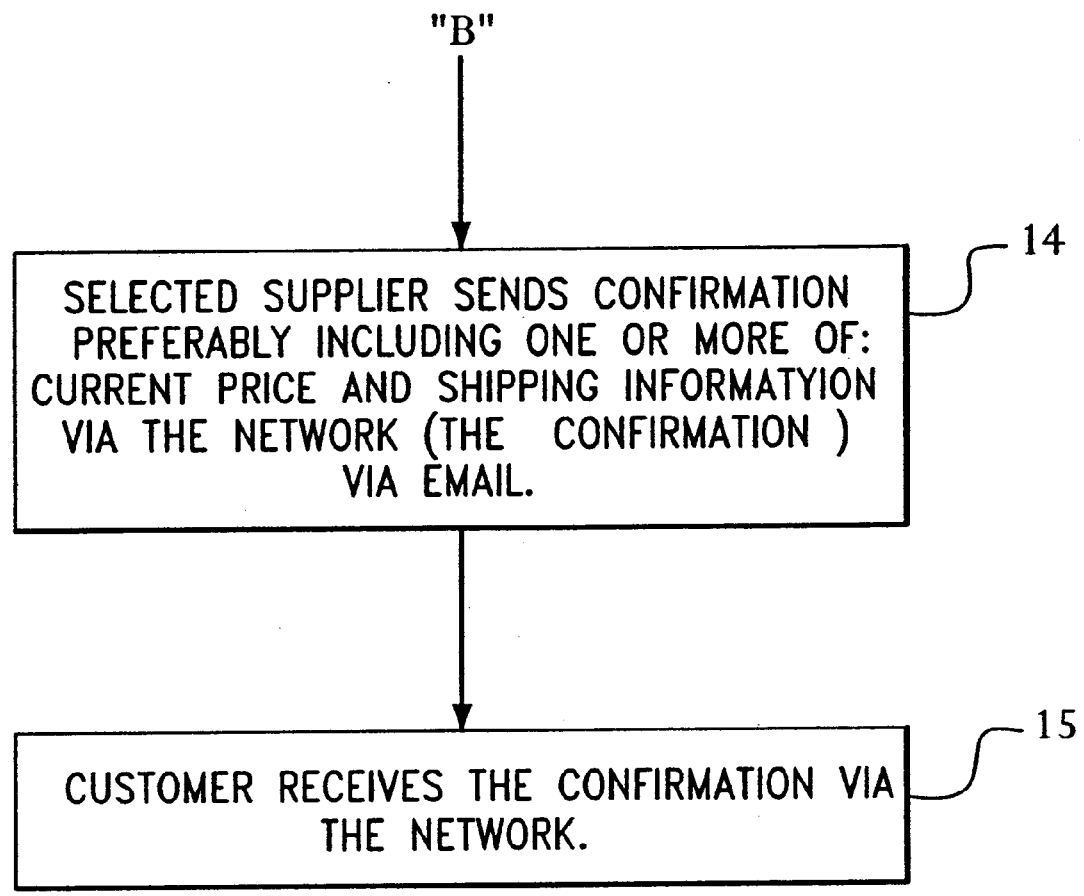
Figure 3A:
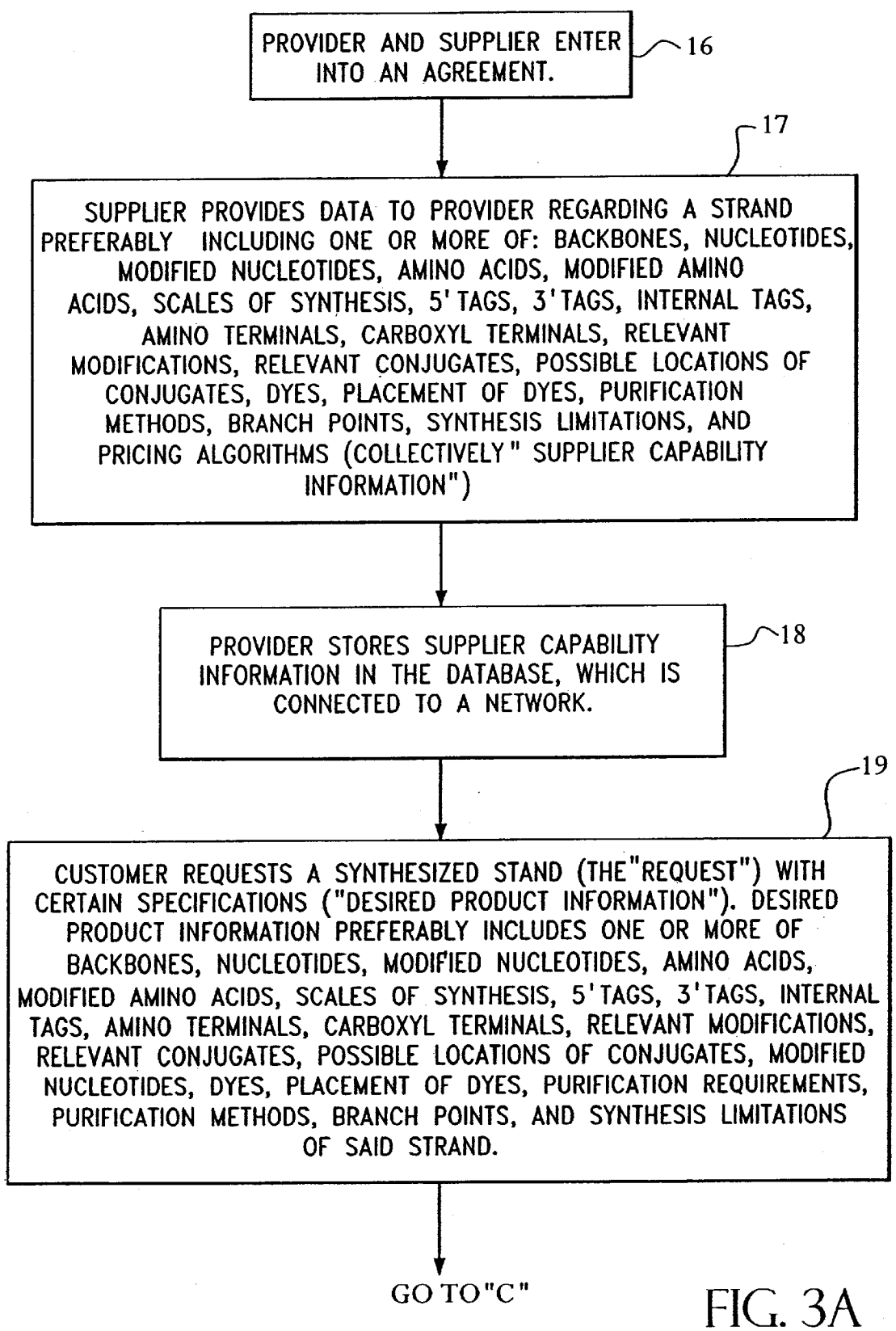
FIGS. 3A–3D represent a flowchart of another embodiment of the invention, which details further steps of the inventive process.
Figure 3B:
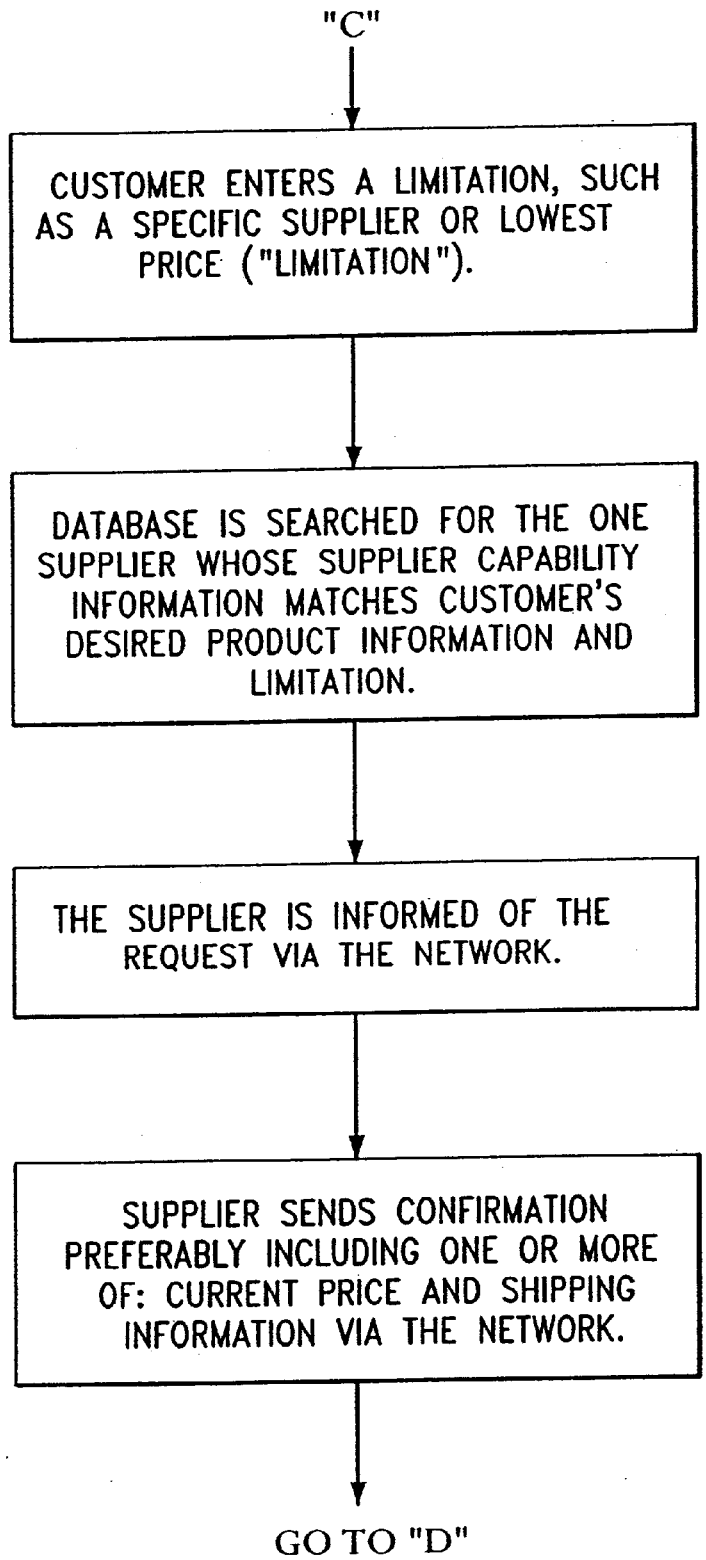
Figure 3C:
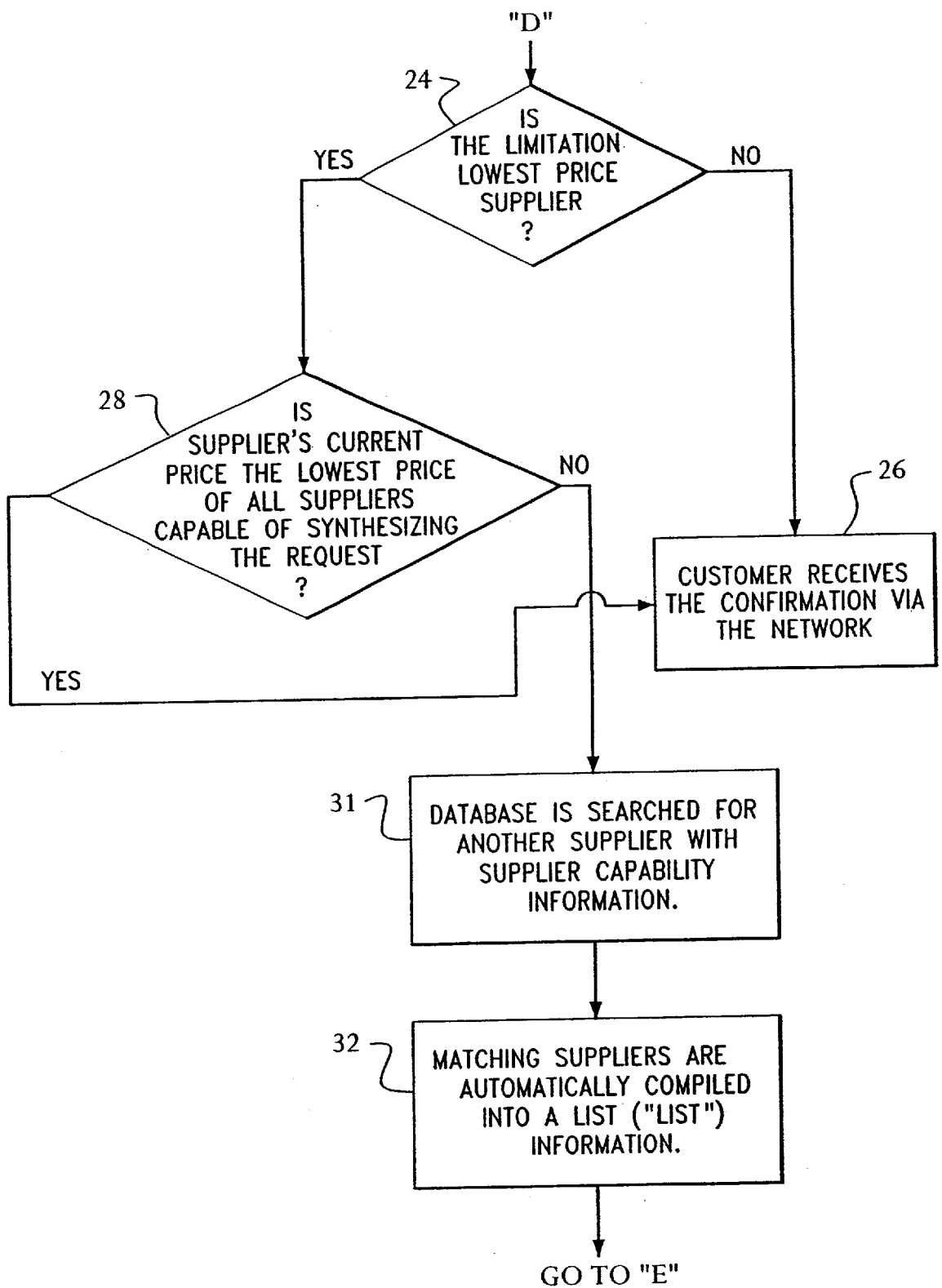
Figure 3D:
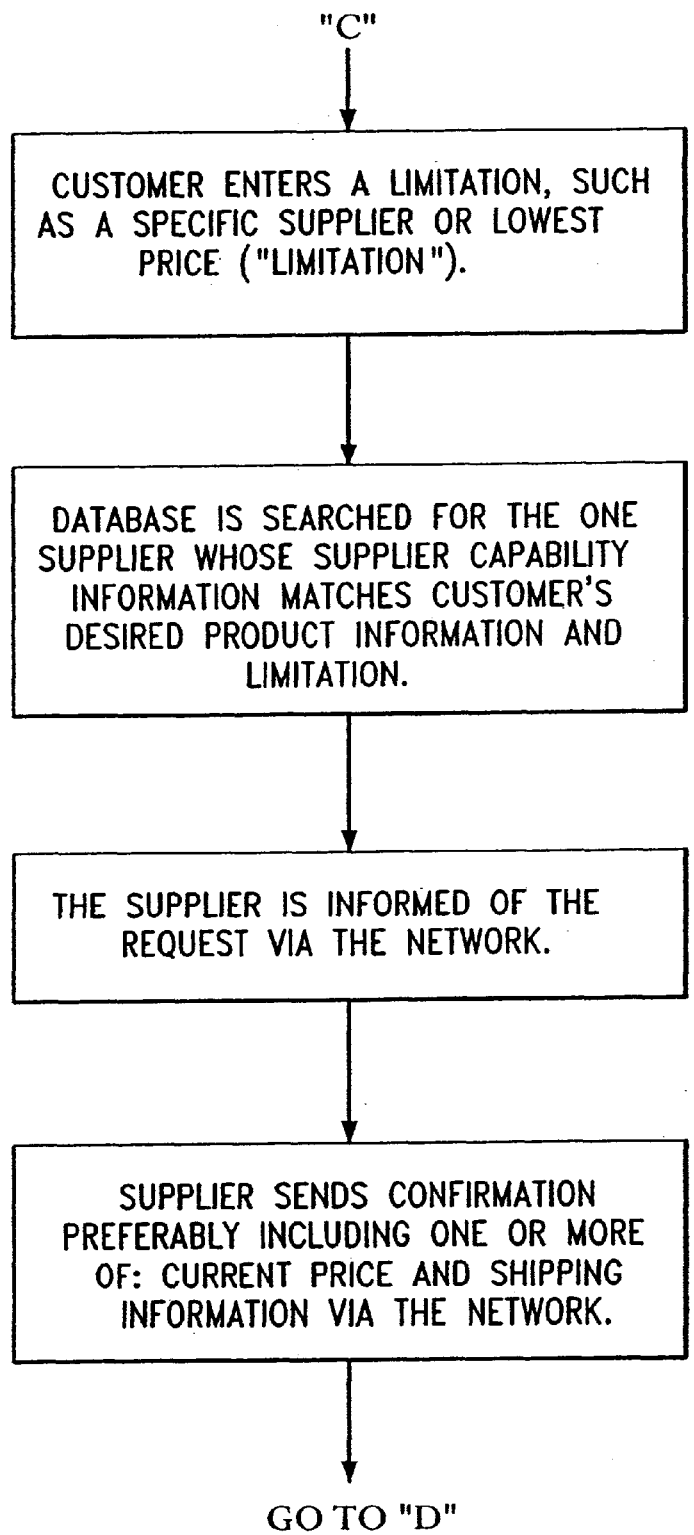
Figure 4A:
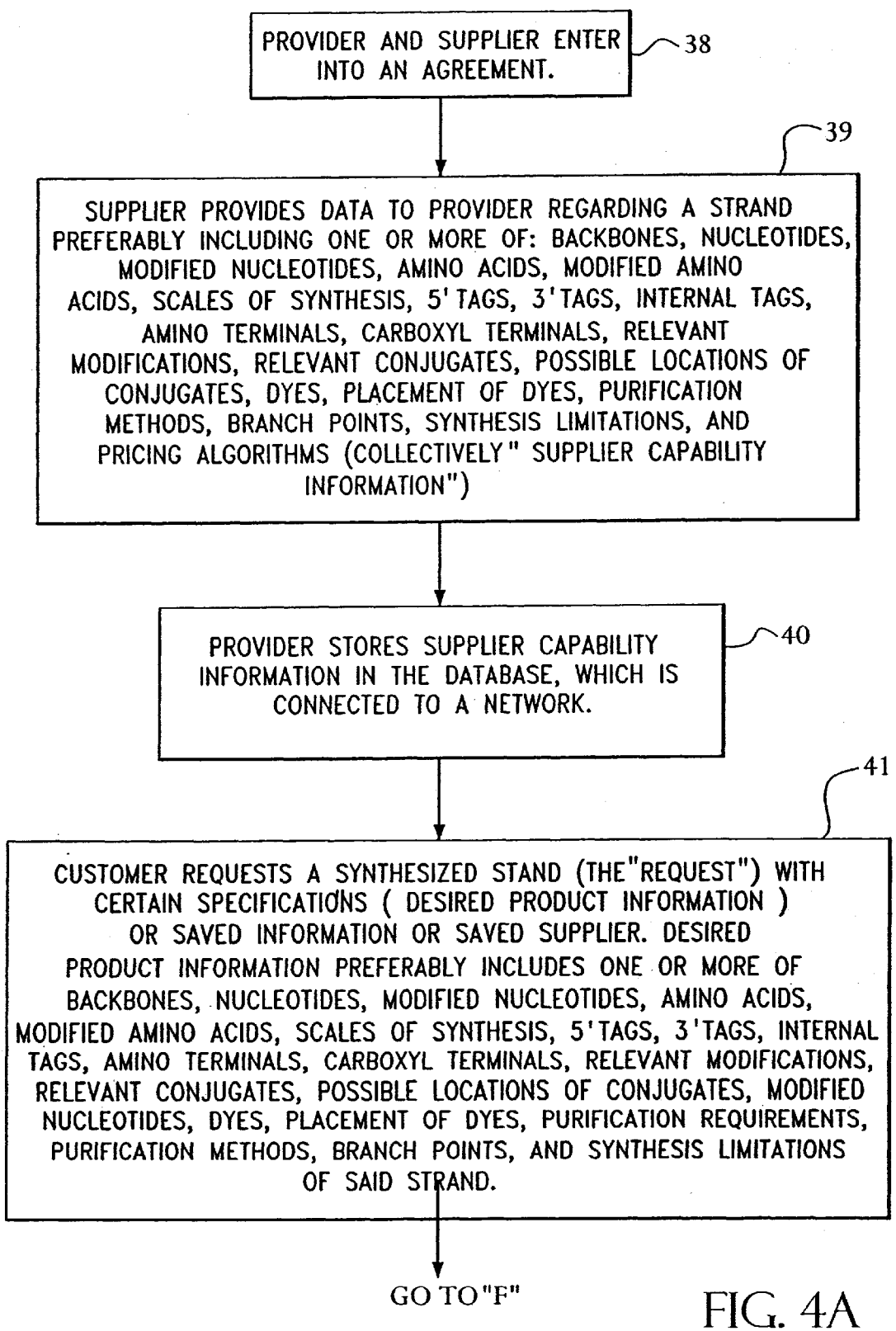
FIGS. 4A–4D represent a flowchart of another embodiment of the invention, which adds steps to the inventive process.
Figure 4B:
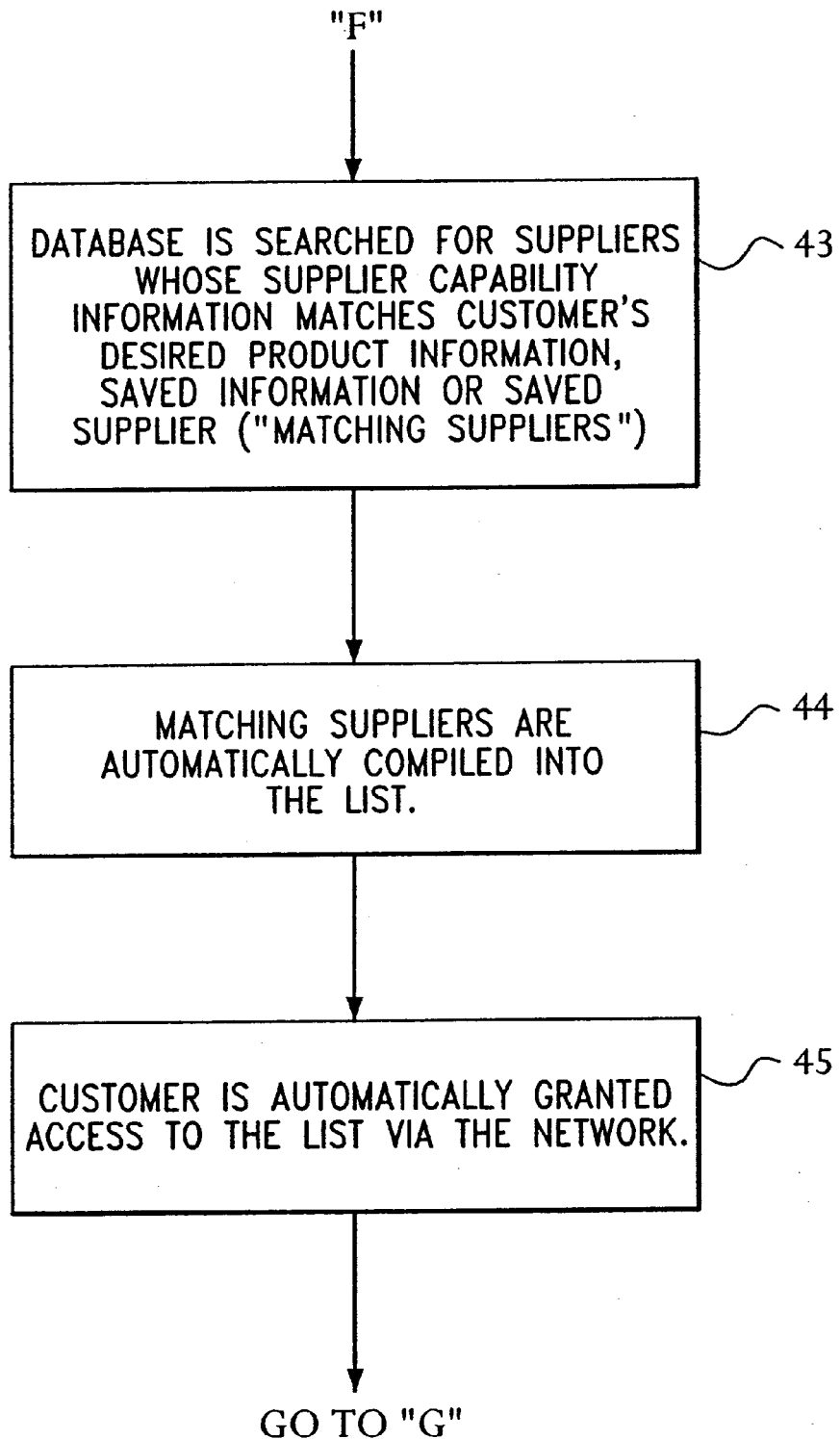
Figure 4C:
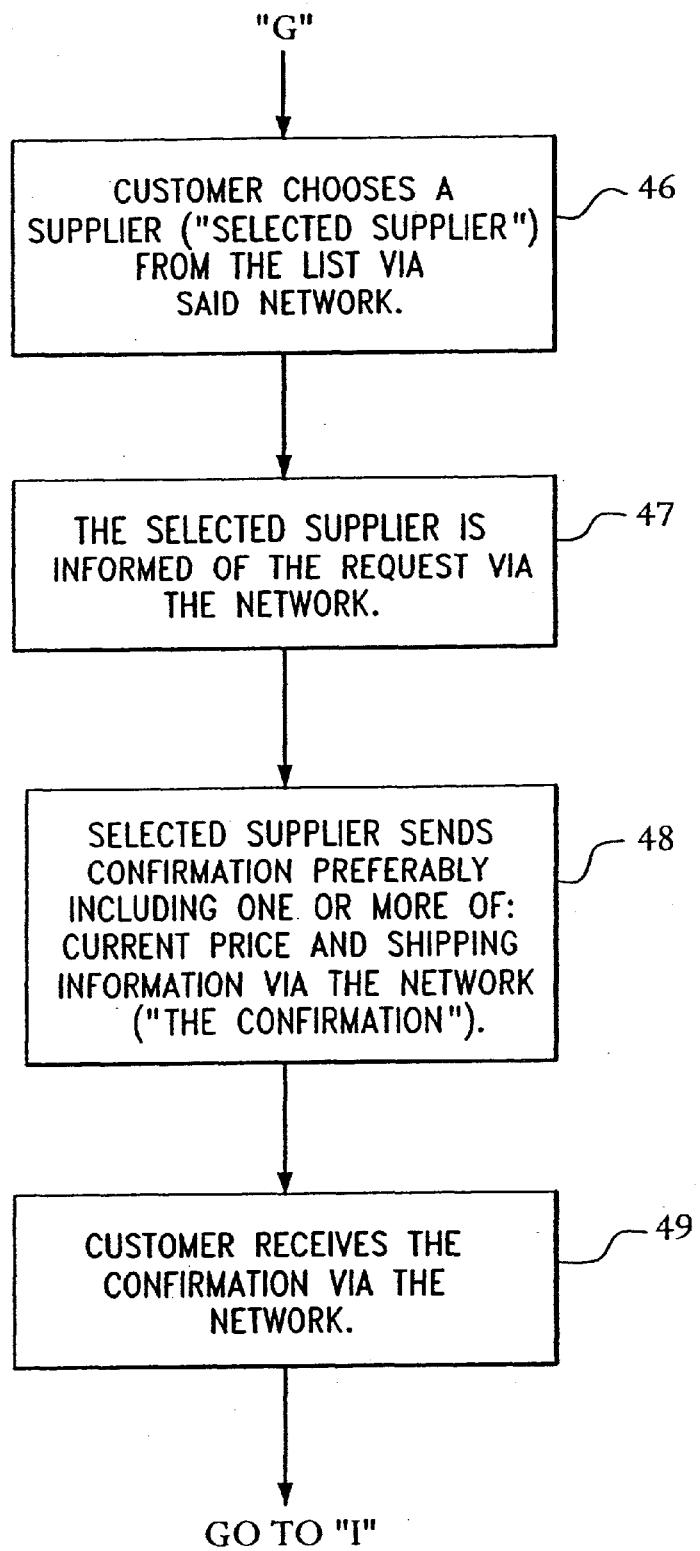
Figure 4D:
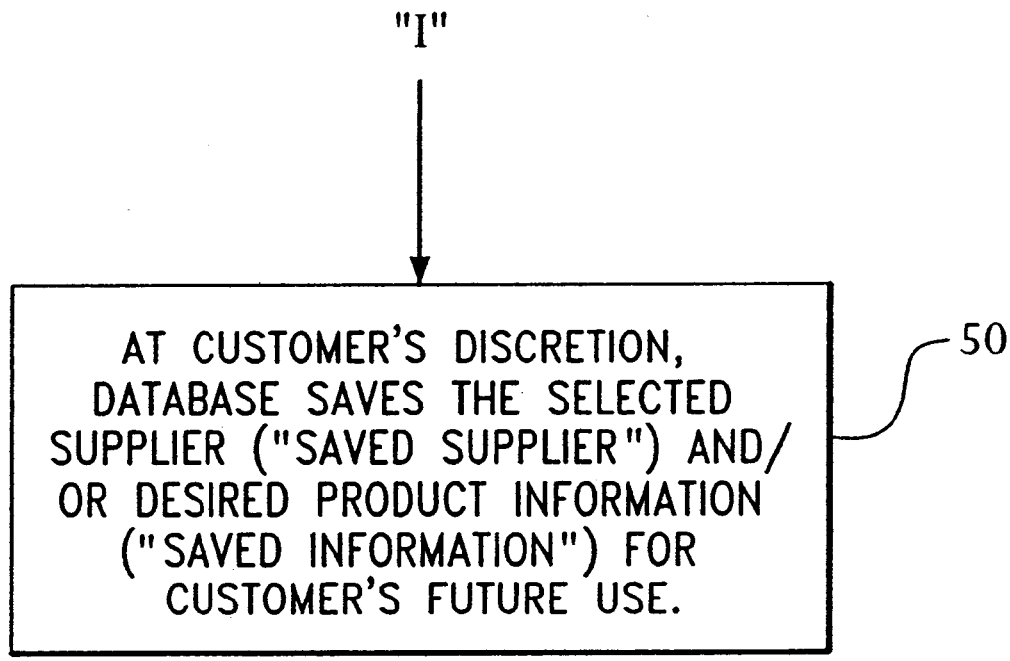

A preferred embodiment of this invention is shown in FIG. 1. In step (1), the Customer desires to purchase a certain synthesized strand, said strand may be an ON, PT or PNA, and the Customer accesses a central Database, which includes Supplier Capability Information form a plurality of different Suppliers. In step (2), the Customer then enters the details of the desired synthesized strand in the Request. In step (3), the Database is searched, preferably automatically, for any and all Suppliers with Supplier Capability Information which meets the Request. The Database is automatically searched, preferably with iterative logic, to correlate the Request with each Supplier who has each and all of the requisite Capabilities to synthesize the Requested Strand. In step (4), the Suppliers generated in the search are compiled into a List for the Customer, preferably including each Supplier's price from that Supplier's pricing algorithm.

Referring now to FIGS. 2A–2D, a separate embodiment of the invention is demonstrated. In this embodiment, the Supplier and Provider enter into an agreement in step (5), in which the Supplier agrees to disclose the Supplier Capability Information, preferably including the Supplier's pricing algorithm to the Provider in step (6) and the Provider stores the Supplier Capability Information in a Database which is connected to a Network, preferably the Internet in step (7).

Continuing with step (8), the Customer connects to the Database via the Network and enters its Request, including one or more of the following: the specification of the sequence of one or more of: nucleotides, modified nucleotides, amino acids and modified amino acids; backbones (which may include, but are not limited to DNA, RNA or 2'-o-Me-RNA); nucleotides; scale of synthesis; 5' tags; 3' tags; internal tags; amino terminals; carboxyl terminals; relevant modifications; relevant conjugates; modified nucleotides; and the placement of said conjugates; dyes and placement thereof; purification requirements; a purification method and synthesis limitations (collectively "Desired Product Information") of said strand.

FIG. 6A is an illustration of an exemplary Web page which would be used for the Customer to enter an exemplary Request The Customer may select one or more of the following: Stock Primers (71), Nucleotides (or "Bases") (72), Modified Nucleotides (or "Modified Bases") (73), Backbones (74), and a Scale of Synthesis (75). FIG. 6B also displays an exemplary Web page which would be used to complete the entering of an exemplary Request by the Customer. Selections of Capabilities may include 5' Tags, Modifications and Conjugates (76), 3' Tags, Modifications and Conjugates (77), Internal Tags (78) and Purification Method (79) or other items in the Request. The items shown in FIGS. 6A and 6B may be combined into one Web page or displayed on numerous Web pages.

Once the Request is entered, the Database is searched, preferably automatically, for one or more Suppliers whose Supplier Capability Information matches the Customer's Desired Product Information ("Matching Suppliers") in step (9). If in step (61), the Database does not contain any Matching Suppliers (63), then in step (64) Customer is automatically informed that the Request cannot be fulfilled because the Strand cannot be synthesized. If in step (61), the Database contains at least one Matching Supplier (62), then step (10) consists of generating, preferably automatically, the compilation of the Matching Suppliers into the List. Customer is granted access, preferably automatically, to the List via said Network in step (I1).

FIG. 6C exemplifies a Web page on which the List is provided for the Customer's Access. The Scale of Synthesis (81) and Prices (82) are set forth for each listed Supplier (80).

Upon reviewing the List in step (12), the Customer selects a Supplier from the List and communicates the selection to the Server connected to the Database via said Network. If, in step (65), Supplier's Price can be calculated for the Strand (66), then the Selected Supplier receives the Request, preferably automatically, via the Network in step (13). If Supplier's Price cannot be calculated for the Strand (67), then the Customer is informed in step (68) that a Price Quote will be sent to the Customer, preferably via electronic mail over the Network.

FIG. 6E exemplifies a Web page which notifies the Customer that a Price Quote must be provided by the Supplier and the Customer may enter a relevant email address (86), if the Database does not already have an email address for the Customer. Supplier sends a Price Quote for the Strand to the Server via the Network and the Server sends the Price Quote to the Customer preferably via electronic mail over the Network in step (69). If Customer accepts the price in the Price Quote in step (70) the process continues.

After reviewing the Request, the Selected Supplier confirms the current price and shipping information regarding the Request via the Network in step (14). The Confirmation appears on a Web page, for example, one similar to FIG. 6D. Specifications (83), Waivers (84), and Supplier (or Vendor) Terms (85) may be included in the Confirmation. The Confirmation is communicated to the Customer via the Network in step (15).

Yet another embodiment is depicted in FIGS. 3A–3D. As seen in the other embodiments, in step (16), the Supplier and Provider enter into an Agreement, where the Supplier provides Supplier Capability Information to Provider in step (17) and Provider stores the Supplier Capability Information in a Database connected to a network ("Network") in step (18). The Customer's Request with Desired Product Information is entered by the Customer in step (19). Further, in step (20), Customer specifies a limitation ("Limitation"), preferably a specific Supplier or the Lowest Price Supplier for the Requested Strand.

The Database is searched in step (21), preferably automatically, for the single Supplier which can fulfill the Request, by matching Supplier Capability Information and Desired Product Information in the Request. For example, if the Limitation is a specific Supplier, the Database will search for that specific Supplier; and if the Limitation is the Lowest Price Supplier, the Database will search for the Lowest Price Supplier with matching Supplier Capability Information. The Supplier, who matches the Limitation and Desired Product Information with the Supplier Capability Information, is informed of the Request via the Network in step (22).

The Supplier confirms current price and shipping information via the Network in step (23). In step (24), if the Limitation is not the Lowest Price Supplier for the Request, the Customer receives the Confirmation via the Network in step (26).

Returning to step (24), if the Limitation is the Lowest Price Supplier, and the current price from the Supplier is higher than the lowest price (e.g. the Supplier has quoted a new, current price higher than the price derived from the Pricing Algorithm and the current price is no longer the lowest price of all Suppliers capable of synthesizing the Request Strand), Database is searched for another Supplier with the Limitation and Supplier Capability Information in step (31). Matching Suppliers are compiled, preferably automatically, into a List in step (32), to which the Customer has been granted access in step (33), preferably automatically. The Customer chooses a Supplier from the List of alternate Suppliers via the Network in step (34). In an effort to receive confirmation from the Selected Supplier, the Selected Supplier is informed, preferably automatically, of the Request via the Network in step (35). The Selected Supplier sends the Confirmation via the Network in step (36), preferably including current price and shipping information, and Customer receives the Confirmation via the Network in step (37).

Returning to step (24), in the event that the Limitation is the Lowest Price Supplier and the Supplier's current price is the lowest price of all Suppliers capable of synthesizing the Request Strand, Customer receives the Confirmation of an order by the Lowest Price Supplier via the Network in step (26).

The invention may also be embodied in the form displayed in FIGS. 4A–4D, which particularly addresses the Saved Information and Saved Supplier aspects of an embodiment. Again, an Agreement exists between the Supplier and Provider in step (38) with the Supplier giving Supplier Capability Information to Provider in step (39) for storage in the Database by Provider in step (40). Customer enters a Request with Desired Product Information, Saved Information or Saved Supplier in step (41), and after receiving the Confirmation, may or may not request, preferably after a prompt or inquiry, (FIG. 6D illustrates an exemplary Web page with the Confirmation included) to have the Request, Desired Product Information, or preferably both, saved in the Database and become Saved Information or Saved Supplier in step (50). Saved Information and Saved Supplier eliminate the time-consuming, tedious hassle of reentering Requests or Desired Product Information every time for every order.

Database is searched, preferably automatically, for Suppliers whose Supplier Capability Information matches Customer's Desired Product Information, Saved Information or Saved Supplier in step (43). Matching Suppliers are automatically compiled into the List in step (44) and the Customer has access to the List in step (45), preferably granted automatically.

Furthering the process of obtaining the Synthesized Strand, Customer chooses a Selected Supplier from the List via the Network in step (46) and the Selected Supplier is informed of the Request via the Network in step (47). Selected Supplier send Confirmation, preferably including current price and shipping information in step (48). Customer receives the Confirmation via the Network in step (49). Customer may or may not request, preferably after a prompt or inquiry, to have the Selected Supplier saved in the Database and become a Saved Supplier in step (50), so that Customer may reorder from Saved Supplier in the future without having to enter the Request and have the search redone again.

Figure 5:
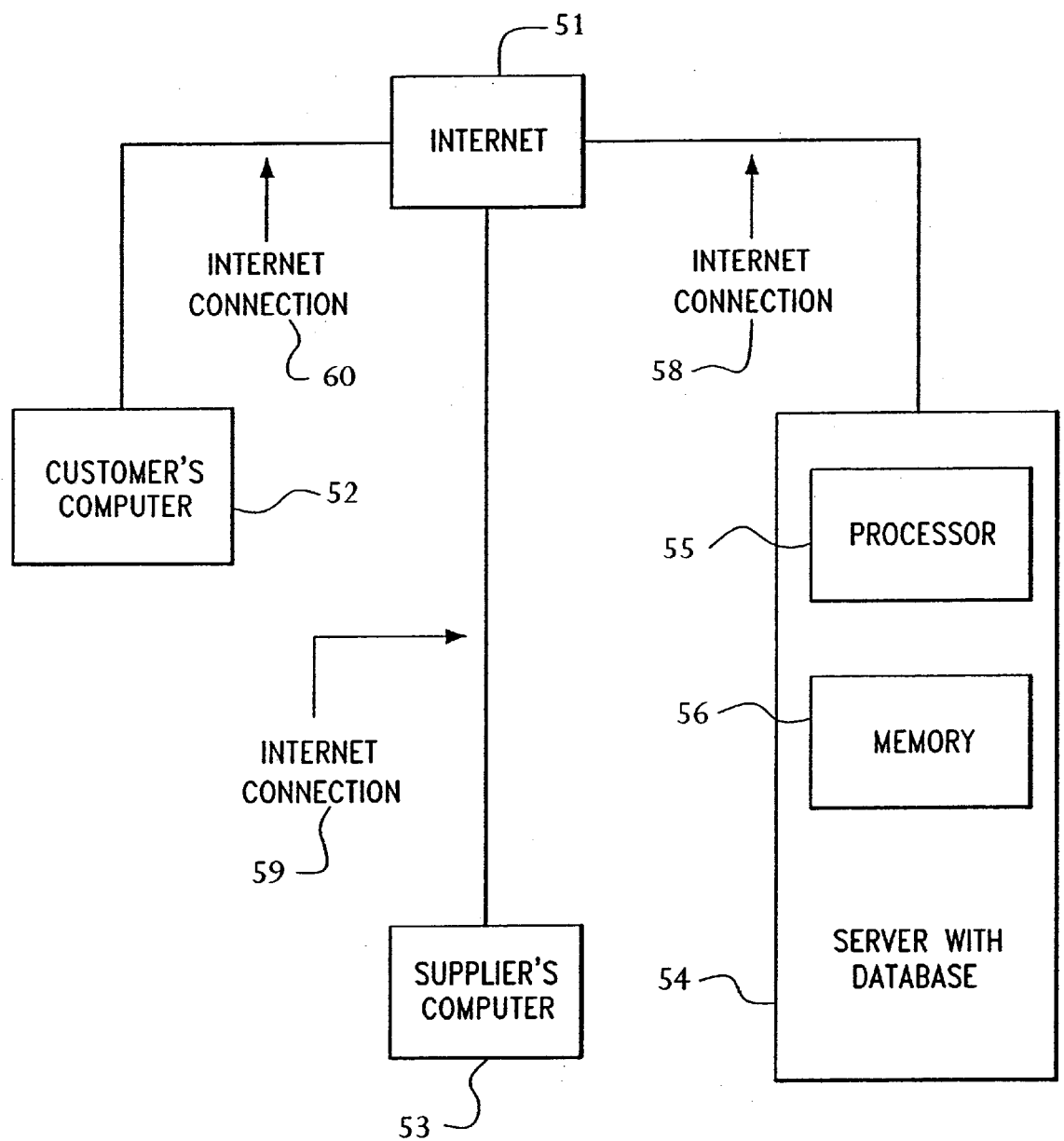
FIG. 5 is a hardware block diagram of a system that may be used to implement a preferred embodiment of the present invention.

Referring to FIG. 5, a preferred embodiment of a system in accordance with the present invention is presented. Server with Database (54) may be a mainframe, minicomputer, microcomputer, or other type of computer or a plurality of computers connected by a network or other means, including at least one processor (55) and memory (56) connected thereto. The methods shown in FIGS. 1, 2A–2D, 3A–3D and 4 are preferably implemented in software on processor (55). Server with Database (54) is connected by Internet Connection (58) to the Internet (51), thus networking with other computers. Customer's Computer (52), which also may be a mainframe, minicomputer, microcomputer, or other type of computer or a plurality of computers connected by a network or other means, is also connected to the Internet (51) via Internet Connection (60), which permits Customer to transmit Requests and access the List. Further, Supplier's Computer (53), which also may be a mainframe, minicomputer, microcomputer, or other type of computer or a plurality of computers connected by a network or other means, is also connected to the Internet (51) via Internet Connection (59), which permits Supplier to transmit Confirmation and Supplier Capability Information to Provider and Provider's Server with Database (54).

In another embodiment of the invention (not shown), a method and system in accordance with the present invention can be used to correlate customer requests and suppliers' capabilities for synthesizing antibodies. In this embodiment, the request would preferably include monoclonal or polyclonal specifications, specified peptides, and specified proteins. The supplier capability information would preferably include monoclonal or polyclonal specifications, specified peptides, and specified proteins.

The present invention may be embodied in other specific forms without departing from the spirit or essential attributes of the invention. Accordingly, reference should be made to the appended claims, rather than the foregoing specification, as indicating the scope of the invention.

What is claimed is:

1. A method for providing information comprising:
   receiving a request from a customer, said request comprising desired product information representing a strand desired by the customer, wherein said strand comprises one of the group consisting of an oligonucleotide, a peptide and a peptide nucleic acid;
   storing data from a plurality of suppliers, said data comprising supplier capability information representing the abilities of each of one or more suppliers to synthesize strands, wherein said supplier capability information is stored in a database, said database being connected to a network that receives said request;

automatically searching said database for one or more suppliers whose supplier capability information matches said desired product information; and automatically generating a list of suppliers whose supplier capability information matches said desired product information.

2. The method of claim 1 wherein said desired product information further comprises a specification of a sequence of one or more of a group consisting of nucleotides and modified nucleotides of said strand.

3. The method of claim 1 wherein said desired product information further comprises a backbone of said strand.

4. The method of claim 1 wherein said desired product information further comprises a scale of synthesis of said strand.

5. The method of claim 1 wherein said desired product information further comprises one or more of a group consisting of amino terminals and modified amino terminals of said strand.

6. The method of claim 1 wherein said desired product information further comprises one or more of a group consisting of carboxyl terminals and modified carboxyl terminals of said strand.

7. The method of claim 1 wherein said desired product information further comprises one or more conjugates of said strand.

8. The method of claim 1 wherein said desired product information further comprises one or more dyes and placement of said dyes in said strand.

9. The method of claim 1 wherein said desired product information further comprises one or more tags in said strand.

10. The method of claim 1 wherein said desired product information further comprises a purification requirement for said strand.

11. The method of claim 1 wherein said desired product information further comprises a purification method for said strand.

12. The method of claim 1 wherein said supplier capability information further comprises one or more backbones of said strands.

13. The method of claim 1 wherein said supplier capability information further comprises one or more nucleotides of said strands.

14. The method of claim 1 wherein said supplier capability information further comprises one or more scales of synthesis.

15. The method of claim 1 wherein said supplier capability information further comprises one or more 5' tags.

16. The method of claim 1 wherein said supplier capability information further comprises one or more 3' tags.

17. The method of claim 1 wherein said supplier capability information further comprises one or more of a group consisting of amino terminals and modified amino terminals of said strands.

18. The method of claim 1 wherein said supplier capability information further comprises one or more of a group consisting of carboxyl terminals and modified carboxyl terminals of said strands.

19. The method of claim 1 wherein said supplier capability information further comprises one or more conjugates of said strands.

20. The method of claim 1 wherein said supplier capability information further comprises one or more dyes and placement of said dyes on said strands.

21. The method of claim 1 wherein said supplier capability information further comprises one or more types of purification methods of said strands.

22. The method of claim 1 wherein said supplier capability information further comprises synthesis limitations of said strands.

23. The method of claim 1 wherein said supplier capability information further comprises one or more pricing algorithms for said strands.

24. The method of claim 1 further comprising:

automatically providing said customer access to said list via said network;

receiving said customer's choice of said supplier from said list via said network;

informing said supplier of said request via said network;

receiving a confirmation from said supplier via said network, said confirmation comprising current price and shipping information; and communicating said confirmation to said customer via said network.

25. The method of claim 24 further comprising:

billing said customer for said request via said network.

26. The method of claim 24 further comprising:

saving said desired product information for future use by said customer.

27. The method of claim 24 further comprising:

saving said customer's choice for future use by said customer.

28. An apparatus for providing information to one or more remote users about which suppliers can supply a strand comprising:

a database that stores data from a plurality of suppliers, said data comprising supplier capability information representing the abilities of each of one or more suppliers to synthesize strands, wherein said strand comprises one of the group consisting of an oligonucleotide, a peptide and a peptide nucleic acid and wherein said database is connected to a network that receives said request; and a server that communicates with said database, and receives requests from remote users via a network, wherein each of said requests comprising desired product information representing a strand desired by one remote user, and wherein said server automatically searches said database for suppliers whose supplier capability information matches said desired product information and automatically generates a list of suppliers whose supplier capability information matches said desired product information.

29. The apparatus of claim 28 wherein said desired product information further comprises a specification of a sequence of one or more of a group consisting of nucleotides and modified nucleotides of said strand.

30. The apparatus of claim 28 wherein said desired product information further comprises a backbone of said strand.

31. The apparatus of claim 28 wherein said desired product information further comprises a scale of synthesis of said strand.

32. The apparatus of claim 28 wherein said desired product information further comprises one or more of a group consisting of amino terminals and modified amino terminals of said strand.

33. The apparatus of claim 28 wherein said desired product information further comprises one or more of a group consisting of carboxyl terminals and modified carboxyl terminals of said strand.

34. The apparatus of claim 28 wherein said desired product information further comprises one or more conjugates of said strand.

35. The apparatus of claim 28 wherein said desired product information further comprises one or more dyes and placement of said dyes in said strand.

36. The apparatus of claim 28 wherein said desired product information further comprises one or more tags in said strand.

37. The apparatus of claim 28 wherein said desired product information further comprises a purification requirement for said strand.

38. The apparatus of claim 28 wherein said desired product information further comprises a purification method for said strand.

39. The apparatus of claim 28 wherein said supplier capability information further comprises one or more backbones of said strands.

40. The apparatus of claim 28 wherein said supplier capability information further comprises one or more nucleotides of said strands.

41. The apparatus of claim 28 wherein said supplier capability information further comprises one or more scales of synthesis.

42. The apparatus of claim 28 wherein said supplier capability information further comprises one or more 5' tags.

43. The apparatus of claim 28 wherein said supplier capability information further comprises one or more 3' tags.

44. The apparatus of claim 28 wherein said supplier capability information further comprises one or more of a group consisting of amino terminals and modified amino terminals of said strands.

45. The apparatus of claim 28 wherein said supplier capability information further comprises one or more of a group consisting of carboxyl terminals and modified carboxyl terminals of said strands.

46. The apparatus of claim 28 wherein said supplier capability information further comprises one or more conjugates of said strands.

47. The apparatus of claim 28 wherein said supplier capability information further comprises one or more dyes and placement of said dyes on said strands.

48. The apparatus of claim 28 wherein said supplier capability information further comprises one or more types of purification methods of said strands.

49. The apparatus of claim 28 wherein said supplier capability information further comprises one or more pricing algorithms for said strands.

50. An apparatus for providing information comprising:
   means for receiving a request from a customer, said request comprising desired product information representing a strand desired by the customer, wherein said strand comprises one of the group consisting of an oligonucleotide, a peptide and a peptide nucleic acid;
   means for storing data from a plurality of suppliers, said data comprising supplier capability information representing the abilities of each of one or more suppliers to synthesize strands, wherein said supplier capability information is stored in a database, that is connected to a network that receives said request;
   means for automatically searching said database for said suppliers whose supplier capability information matches said desired product information; and
   means for automatically generating a list of suppliers whose supplier capability information matches said desired product information.

51. A method for providing information comprising:
   receiving a request from a customer, said request comprising desired product information representing a strand desired by the customer, wherein said strand comprises a polymer;
   storing data from a plurality of suppliers, said data comprising supplier capability information representing the abilities of each of one or more suppliers to synthesize strands, wherein said supplier capability information is stored in a database, said database being connected to a network that receives said request;
   automatically searching said database for one or more suppliers whose supplier capability information matches said desired product information; and
   automatically generating a list of suppliers whose supplier capability information matches said desired product information.

52. An apparatus for providing information to one or more remote users about which suppliers can supply a strand comprising:
   a database that stores data from a plurality of suppliers, said data comprising supplier capability information representing the abilities of each of one or more suppliers to synthesize strands, wherein said strand comprises a polymer and wherein said database is connected to a network that receives said request; and
   a server that communicates with said database, and receives requests from remote users via a network, wherein each of said requests comprising desired product information representing a strand desired by one remote user, and wherein said server automatically searches said database for suppliers whose supplier capability information matches said desired product information and automatically generates a list of suppliers whose supplier capability information matches said desired product information.

* * * * *